UNITED STATES PATENT OFFICE.

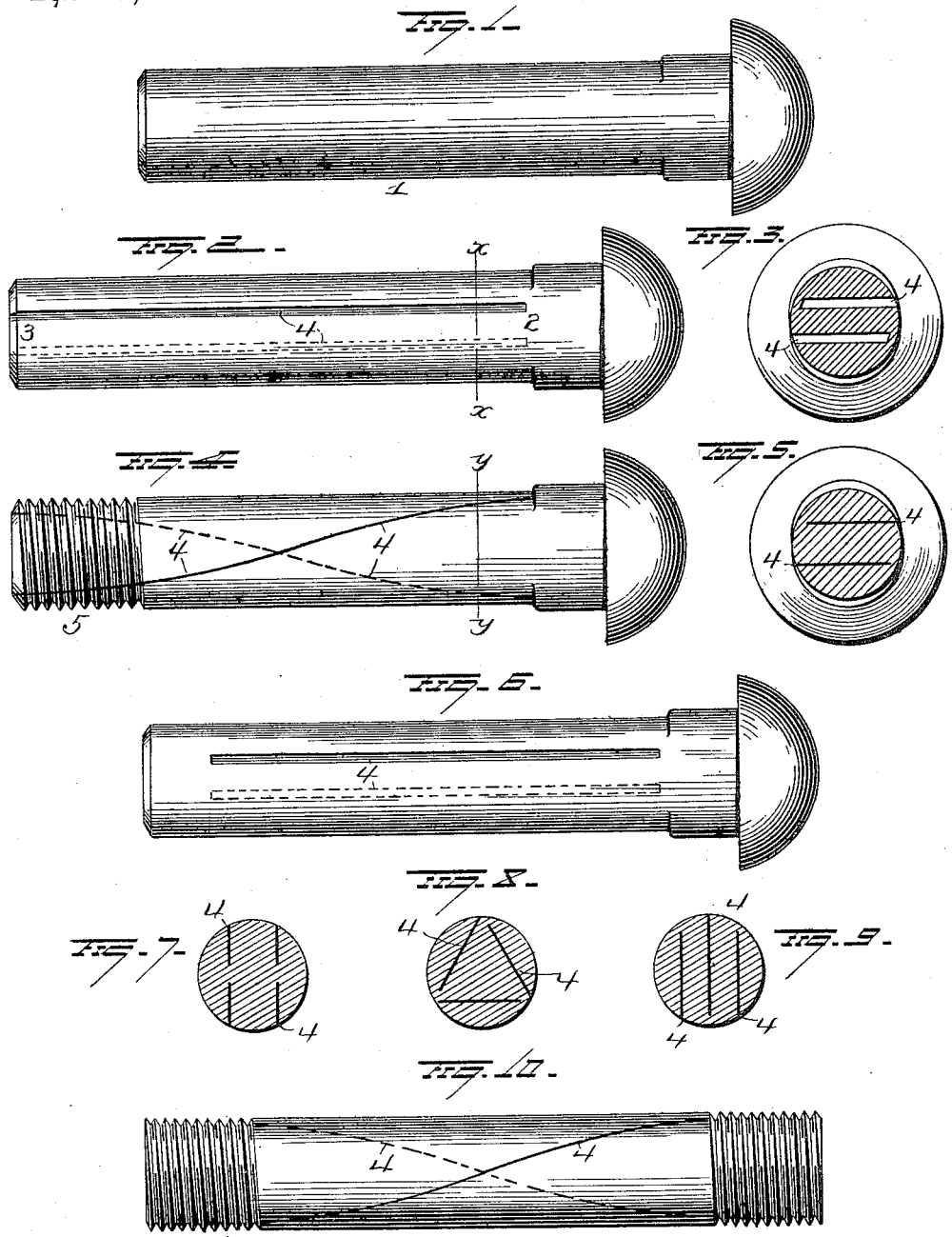

ETHAN I. DODDS, OF PITTSBURGH, PENNSYLVANIA, ASSIGNOR TO FLANNERY BOLT COMPANY, OF PITTSBURGH, PENNSYLVANIA.

BOLT.

1,209,945.  Specification of Letters Patent.  Patented Dec. 26, 1916.

Application filed October 19, 1914. Serial No. 867,411.

*To all whom it may concern:*

Be it known that I, ETHAN I. DODDS, of Pittsburgh, in the county of Allegheny and State of Pennsylvania, have invented certain new and useful Improvements in Bolts; and I do hereby declare the following to be a full, clear, and exact description of the invention, such as will enable others skilled in the art to which it appertains to make and use the same.

My invention relates to an improvement in bolts designed more particularly for connecting rail road rails, and the sections of frogs and switch rails, the object being to provide a bolt capable of slight elongation or spring action longitudinally, and which will resume its normal length after the pressure has been removed, thus preventing the metal in the bolt from becoming permanently set, and removing, to a large extent the tendency of the nuts to work loose.

With these objects in view my invention consists in the details of construction as will be more fully explained and pointed out in the claims.

In the accompanying drawings, Figure 1 is a view of the bolt blank; Fig. 2 is a view of the same slotted; Fig. 3 is a view in cross section of same on line $x$—$x$ of Fig. 2; Fig. 4 is a view of the completed bolt; Fig. 5 is a view in section on the line $y$—$y$ of Fig. 4; Fig. 6 is a view of a modified form; Figs. 7, 8 and 9 show modified arrangement of the slots in the bolt, and Fig. 10 is a view of a frog or switch bolt threaded at both ends.

In the manufacture of the bolt, a round bar of steel is heated to the upsetting point and headed in dies in the usual manner, and while it is hot from the original heating or reheating, it is slotted from its shoulders 2 to its end 3, the slots 4 extending nearly but not all the way through the bolt 1. The blank or bolt is then twisted a quarter turn so that the slots are in the forms of spirals each extending less than 180° around the bolt shank. The threads 5 at the end of the bolt may be hot or cold rolled, or they may be cut, but in either event they are formed after the bolt shank has been twisted.

During the process of manufacture, and before or after the threads have been cut, the bolts are tempered in oil, so as to increase their hardness without affecting their elasticity.

I prefer to provide the bolt with two slots located at opposite sides of the shank, and each extending nearly through the shank, but if desired they may stop short of the free end as in Fig. 6, or they may be disposed as in Figs. 7, 8 and 9. After the slots have been formed and before the threads are rolled or cut, the bolt shank is subjected to dies or other devices for closing the slots without welding them together, as shown in Fig. 5.

A steel bolt slotted and twisted as described, is capable of slight elongation which permits it to give or yield under the pounding of the wheels on the rails at the joints, and immediately goes back to normal length as soon as the strains are relieved. This prevents permanent elongation of the bolt, and maintains the nut at all times under a pressure sufficient to prevent it from turning, as it does do on ordinary bolts after usage sufficient to cause a slight elongation of the bolt. By constructing the bolt so that it will give under pressure and then go back to its normal length, the nut will always be under the original pressure to which it was subjected when applied to the bolt.

The construction shown in Fig. 10 is designed for connecting the section of a frog or switch rail and is like the bolt described except that it is threaded at both ends.

If the twist to the bar be 180° or more the bar will be flexible laterally but there will not be any perceptible elongation under tension, due to the fact that the sections bind on each other instead of straightening out, whereas with a twist of less than 180° the sections are free to straighten out or elongate without binding.

While I have designed the bolt particularly for locking rails at the joints, it may be used for other purposes where an extensible or resilient bolt is desirable.

I make no claim in this case broadly to a bolt having a slot or a plurality of slots extending part way through the shank, the shank of the bolt being twisted, as such construction forms the basis of my applications No. 867,413 and No. 867,410, filed October 19th, 1914.

Having fully described my invention what I claim as new and desire to secure by Letters-Patent, is:—

1. A bolt formed of a single bar of metal, the shank of the bolt having a slot extending longitudinally of the same and inwardly past the center but stopping short of the opposite side, the said shank being twisted not more than a quarter turn.

2. A bolt formed of a single bar of steel and having a plurality of oppositely disposed slots extending more than half the diameter of the bar the bar being twisted less than a half turn.

3. A bolt formed of a single bar of steel and having a plurality of oppositely disposed slots extending more than half the diameter through the bar, the said bolt having a head at one end and threaded at the other end.

4. As a new article of manufacture a stay bolt having a plurality of slots extending part way through the shank of the same from opposite sides thereof, and past the transverse center, the shank of the bolt being twisted.

5. As a new article of manufacture a stay bolt, the shank of which has a plurality of spiral slots extending past the transverse center of the shank.

6. A stay bolt shank having a plurality of slots extending lengthwise the shank and part way through the same, the closed edges or bottom walls of the slots being sufficiently thin so as to be ruptured by the stresses to which the bolt is subjected.

In testimony whereof, I have signed this specification in the presence of two subscribing witnesses.

ETHAN I. DODDS.

Witnesses:
B. E. D. SAFFORTH,
EDWIN S. RYCE.

Copies of this patent may be obtained for five cents each, by addressing the "Commissioner of Patents, Washington, D. C."